United States Patent [19]
Conradty et al.

[11] Patent Number: 4,639,928
[45] Date of Patent: Jan. 27, 1987

[54] DISC MEANS FOR AN ELECTRODE FOR USE IN ELECTRIC ARC FURNACES

[75] Inventors: Claudio Conradty, Röthenbach/Pegnitz; Dieter Zöllner, Schwaig/Nürnberg; Inge Lauterbach-Dammler, Nuremberg; Thomas Taube, Erlangen-Steudach, all of Fed. Rep. of Germany

[73] Assignee: Arc Technologies Systems Ltd., Grand Cayman, Cayman Islands

[21] Appl. No.: 588,788

[22] Filed: Mar. 12, 1984

[30] Foreign Application Priority Data

Mar. 22, 1983 [CH] Switzerland .......................... 1545/83

[51] Int. Cl.[4] ............................................... H05B 7/08
[52] U.S. Cl. ...................................................... 373/93
[58] Field of Search .............................. 373/91, 92, 93

[56] References Cited

U.S. PATENT DOCUMENTS 4,468,783  8/1984  Bauer et al. ........................... 373/93

FOREIGN PATENT DOCUMENTS 123017  2/1919  United Kingdom .................. 373/92
2087699  5/1982  United Kingdom .

Primary Examiner—Roy N. Envall, Jr.
Attorney, Agent, or Firm—John J. Freer

[57] ABSTRACT

In an electrode for electric arc furnaces, having a water-cooled metallic electrode holder and a consumable section connected to the electrode holder by means of a threaded nipple, the electrode holder having a protective jacket made up of rings. A disc positioned between the consumable section and the electrode holder which, in the event of a fracture of the consumable section, remains attached to the electrode holder for protection against electric arc strike.

11 Claims, 7 Drawing Figures

DISC MEANS FOR AN ELECTRODE FOR USE IN ELECTRIC ARC FURNACES

FIELD OF THE INVENTION

The invention relates to an electrode for arc furnaces, and more particularly to an electrode, having an upper, metallic, water-cooled electrode holder, surrounded by a protective jacket resistant to temperature variations and mechanical stress, and a consumable section threadably connected to the electrode holder by means of a threaded nipple.

BACKGROUND OF THE INVENTION

Developments in the mineral oil sector and in the steel industry have resulted recently in efforts to utilize water-cooled combination electrodes for industrial arc electrode processes.

Compared to uncooled electrodes, one important advantage offered by a water-cooled electrode is a reduction in the consumption of electrode graphite during operation, an attractive improvement for electric steel works, resulting both from recent excessive increases in price of raw materials making desirable a reduction of steel production costs in general, and rising energy costs making desirable any savings in energy consumption.

Prior developments in this field are set forth in detail in European Patent Specifications Nos. 50682, 50683 and 51074 (U.S. Pat. Nos. 4,468,783, 4,425,657, and 4,466,105), but still leave room for desirable further developmental efforts. European Patent Specifications Nos. 50682, 50683 and 51074 describe combination electrodes which include a water cooled metallic electrode holder surrounded by temperature resistant rings protecting the electrode holder against the furnace atmosphere. A consumable section of graphite is threadably connected to the lower end of the electrode holder by means of a threaded nipple. A lower front plate of the electrode holder is covered by an upper, front face of the consumable section and is therefore not exposed to hazardous furnace environmental conditions or attack by an electric arc strike during normal arc furnace operation.

Where the furnace is operated in an inappropriate manner or where scrap material is very heavy, the consumable sections may occasionally break. In the event of breakage, the unprotected lower front plate of the electric holder may be exposed to elevated temperature and to an electric arc, which exposure may lead to a damage of the metal section.

DISCLOSURE OF THE INVENTION

One object of the present invention is, therefore, to develop a reliable combination electrode having good emergency properties. A second object is to reduce required repair work when a consumable section breaks off.

The present invention, provides a disc being arranged between the electrode holder and the consumable section. The disc covers and is connected to the lower front plate of the electrode holder and consists of a material of good conductivity resistant to thermal and mechanical stress. The disc includes a central opening having a diameter corresponding essentially to the diameter of a threaded nipple which threadably joins the consumable section to the electrode holder.

The disc may be attached to the electrode holder by a plurality of means. The disc, located between the electrode holder and the consumable section, may be combined with the lowest ring of a plurality of rings constituting a protective electrode-holder jacket to form a single solid protective member. This protective member often takes the form of a sleeve nut, with a cylindrical part being screwed on the electrode holder thereby covering the lower front plate of the electrode holder.

The protective member may alternatively consist of two separate positively joined parts reducing the possibility for unfavourable mechanical prestress. Moreover, the two parts may consist of different materials each having performance characteristics suited for their particular function.

An alternate embodiment for connecting the disc to the electrode holder requires employment of an electrode holder having a lower front plate including pointed thorn-like projections which penetrate the disc when the disc is pressed against the electrode holder retaining it in such a manner that it may be removed from the electrode holder only by force.

If the two latter types of fastening are used, the disc may be radially externally surrounded by the protective jacket, arranged to protrude beyond the lower front face of the electrode holder, thus protecting the disc against attack by the furnace environment.

BEST EMBODIMENT OF THE INVENTION

Figures 1, 5:
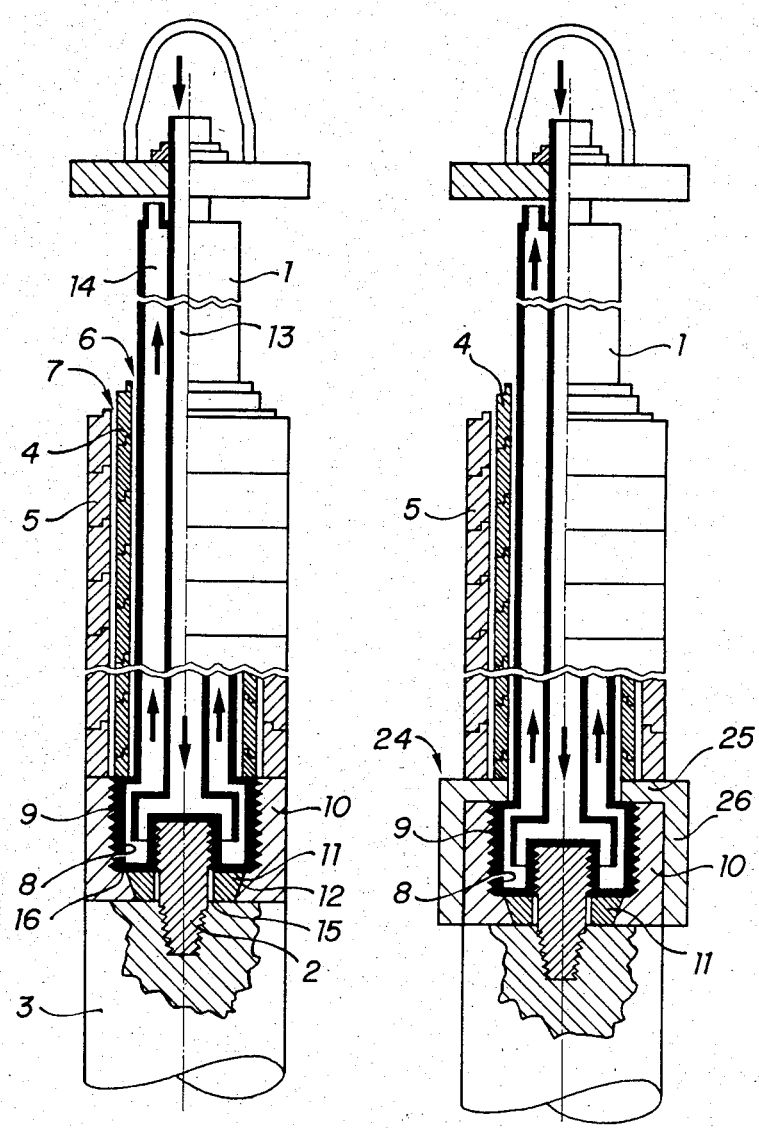
FIG. 1 shows a side elevational view partially in section of an electric arc electrode according to the invention.
FIG. 5 depicts still a further embodiment of the discs of the invention.

Referring to the drawings, FIG. 1 shows an electric arc electrode which comprises an upper, metallic electrode holder 1 and a consumable section 3 threadably connected to the electrode holder by means of a threaded nipple 2. Over a considerable part of its total length a so-called protected section, the metallic electrode holder is surrounded by protective rings of a high-temperature resistant material that is material resistant to the deleterious effects of elevated temperature.

In the sectional illustration of FIG. 1 the protective jacket consists of two concentric hollow cylinders each composed of rings 4 arranged surrounding the metallic electrode holder including a clearance 6 and of rings 5 being arranged surrounding the rings 4 also including a clearance 7, to form a double protective jacket. The inner rings 4 may consist of a ceramic or electrically conductive material. Alternatively, the inner hollow cylinder may be a steel tube snugly surrounding the metallic electrode holder 1.

The rings 5 typically consist of graphite or of a suitable or conventional mixture of graphite and a ceramic component. Sufficient graphite is necessary in the mixture to assure that the rings cannot be wetted by furnace slag.

This non-wetting requirement must be maintained over the outside surface of the protective jacket during the entire duration of furnace operation. If a material is used which can be wetted by slag, the diameter of the electrode will gradually increase as a result of slag deposits on external surfaces of the electrode soon precluding removal of an electrode via a roof opening and a support arm associated with the arc furnace.

The electrode holder comprises a lower section 8 having a larger diameter than the protected section, the lower section including a male thread 9. A lower front plate 16 of the electrode holder includes a tapped hole into which the threaded nipple 2 is screwed. The lower section 8 is surrounded by a ring 10 threadably engaging the male thread 9. The ring 10 is positively connected with a disc 11, (shown in detail in FIG. 3b), wherein each of the disc 11 and the ring 10 includes a conical shaped portion 12 and 12' respectively, by means of which the disc 11 and the ring 10 are connected each to the other in a positive manner, forming together a protective member generally resembling a sleeve nut.

Figure 3A:
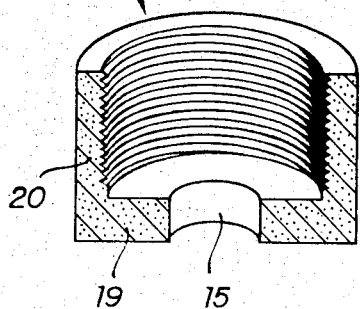
FIGS. 3a and 3b are sectional views of discs in accordance with the instant invention.

Alternatively, a one-piece solid protective member may facilitate handling and assembly. Such a one-piece protective member is illustrated in FIG. 3a, showing a protective member 21 having a ring 20 including an internal thread and a disc 19 having a central opening 15 for the passage of the threaded nipple.

In FIG. 1 the nipple 2 comprises a lower part having a threaded conical shape, by means of which the consumable section 3, having a corresponding thread box or bore, threadably engages the electrode holder 1.

The purpose of the arrangement of a graphite disc 11, 19 in the connection zone between electrode holder and consumable section in accordance with the invention is to ensure that, in the event of a nipple or nipple box fracture resulting in the consumable section, breaking off the lower front plate 16 of the electrode holder remains protected by this disc against an arc strike and against the oxidizing, high temperature environment of the arc furnace.

Referring to FIG. 1, cooling water passes via a central duct 13 to a lower section 8 of the electrode holder, whereupon altering direction of flow, the water rises again through an annular space 14. If the electric arc were to strike directly on the metallic electrode holder after a break-off of the consumable section, water would leak into the furnace virtually immediately, which must be avoided.

When employing two-part protective members 22 the two parts may be fabricated from different materials ideally suited for different functions for which the parts are employed. The ring 10, the external surfaces of which are exposed to the furnace environment and, occasionally, to an electric arc strike as well as to splashes of slag, may consist of a mixture of graphite and a ceramic component, provided that the surface maintains non-wettability as to slag. The disc 11 of the protective member, which, primarily should have a good electric conductivity and needs only limited protective properties necessary for brief furnace exposures in case of electrode break-off, consists of pure, high quality graphite.

The central opening 15 of the disc 11 illustrated in FIG. 1 has a diameter approximately equal to the diameter of the threaded nipple 2 in the plane of the disc. When the consumable section breaks off, it is important that the gap between the remainder of the nipple and the disc 11 be as small as possible to forstall the electric arc from striking the lower front plate.

Figure 2:
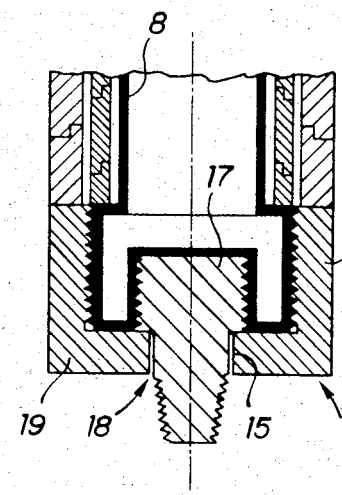
FIG. 2 depicts in side elevation sectional view the joint or connection between an electrode holder and an electrode active portion.

In this context, FIG. 2 shows in a schematic manner an embodiment of a disc 19 and a nipple which assures are strike protection where fabrication tolerances are sloppy resulting in a gap 18. A cylindrical part 17 of the threaded nipple 2 has a diameter which is somewhat larger than the diameter of the central bore 15 of the disc 19, thus completely closing the central bore 15. Where the consumable section breaks, it will thus be difficult for the electric arc to strike the lower section 8 of the metallic electrode holder reducing the danger of damage the electrode holder.

The nipples 2, 17 as shown in FIGS. 1 and 2 respectively, may have threadless zones corresponding to the thickness of the discs 11, 19.

Figure 4:
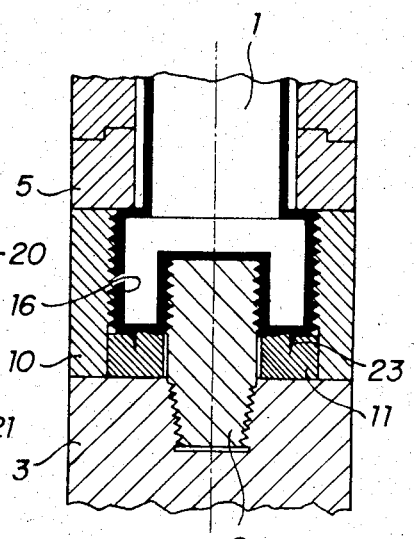
FIG. 4 depicts an alternate embodiment of the disc of the instant invention.

In FIG. 4, an electrode holder 1 is surrounded by only a layer of rings 5. Dual concentric rings may alternatively be employed. A lowest ring 10 protrudes beyond the lower front plate 16 of the electrode holder by an amount generally corresponding to the thickness of a disc 11, arranged within the ring 10 so as to shield the electrode holder 1 from below.

Figure 6:
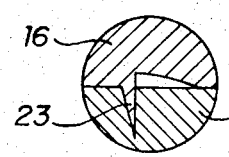
FIG. 6 is an expanded view of a portion of FIG. 4.

The disc 11 is fastened by means of thorns 23 or projections from the lower front plate 16 of the electrode holder, as shown in FIG. 6.

Such thorns or projections 23 may be configured to project a right angle from the lower front plate 16, or the projections may project in a direction having a horizontal component. The horizontal component preferably is oriented in a direction configured to oppose the direction of rotation of the consumable section 3 as the consumable is threadably joined to the electrode holder 1.

When the consumable section 3 is screwed on by means of the threaded nipple 2, the disc 11 is forced upon the thorns 23 which penetrate the disc, thus creating a mechanically firm connection. As illustrated, the thorns may be formed directly out of the front plate or they may be inserted into the front plate by means of threads or other suitable or conventional fastening means.

FIG. 5 illustrates a further embodiment of the invention in the context of an arc furnace electrode according to FIG. 1.

A one piece covering member 24 of the same general shape as the protective member as shown in FIG. 3 is arranged upside down surrounding the protective member 10 and disc 11.

The horizontal disc-like portion 25 of the covering member 24 shields the ring 10 from above and is carried upon a shoulder of the electrode holder which is formed between the protected section and the lower section of the electrode holder. The rings 4 and 5 of the protective jacket abut the disc-like portion 25.

The portion 26 of the member 24 encircles the ring 10 for protection from the furnace environment.

Figure 3B:
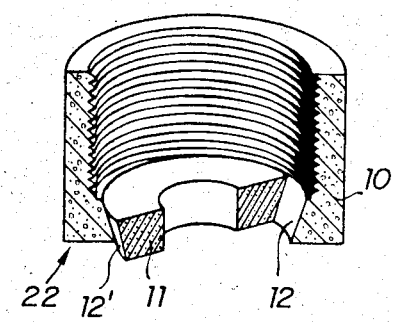

Employing a member 24 any protective member composed of one piece or of two pieces as illustrated in FIGS. 3a and 3b may be used, because both parts may be of common material and accordingly be formed as a single piece since it is no longer important that the ring 10 be of a material other than that of the disc 11 in order to better withstand oxidation. Still the desirability for lowering mechanical stresses may be sufficiently important to warrant choosing a two piece composite protective member.

While a preferred embodiment of the invention has been shown and described in detail, it should be apparent that various modifications may be made thereto without departing from the scope of the claims that follow.

What is claimed is:

1. In an arc furnace electrode, having an upper-metallic, water-cooled electrode holder, surrounded by a protective jacket resistant to elevated temperature and mechanical stress, and a consumable section, threadably connected to the electrode holder by means of a threaded nipple, the improvement comprising a disc arranged between the metallic part of the electrode holder and the consumable section, said disc being attached to or carried by said metallic part while being in covering contact with a lower front plate of said metallic part of the electrode holder, with the disc being formed from a material having good electrical conductivity and resistance to thermal and mechanical stress, said disc having a central aperture having a diameter essentially corresponding to the diameter of the threaded nipple.

2. The electrode of claim 1, said protective jacket comprising rings, said disc being attached to a lowest ring by combination therewith into one piece constituting a protective member comprising a cylinder and a disc portion.

3. The electrode of claim 1, said protective jacket comprising rings, with the disc being held by engagement with a lowest ring of said protective jacket, said lowest ring and disc together forming a two piece protective member.

4. The electrode of claim 3, said ring and disc being formed from different materials, with said ring consisting essentially of a mixture of graphite and a ceramic component resistant to oxidation, and said disc consisting essentially of electrically conductive graphite.

5. The electrode of claim 1, said protective jacket comprising two hollow concentric cylinders, with at least one cylinder being formed from rings, an inner cylinder consisting essentially of a ceramic material and the outer hollow cylinder consisting essentially of a mixture of graphite and a ceramic component.

6. The electrode of claim 1, said lower front plate of the electrode holder having projections for engaging the disc, said projections protruding from the lower front plate of the electrode holder at an angle varying from a right angle to an oblique angle infringed to oppose threadable attachment rotation of the consumable portion.

7. The electrode of claim 6, an outer diameter of the disc being essentially equal to an inner diameter of the lowest ring of a plurality of rings, comprising the protective jacket.

8. The electrode of claim 7, cylindrical surface areas of the disc being surrounded by the protective jacket, which extends beyond the lower front plate of the electrode holder.

9. The electrode of claim 1, said protective jacket comprising two concentric hollow cylinders, at least one hollow cylinder being formed from rings, an inner hollow cylinder being formed from an electrically conductive material and the outer hollow cylinder being formed from a mixture of graphite and a ceramic component.

10. The electrode of either one of claims 5 or 9, the inner hollow cylinder being metallic.

11. The electrode of either one of claims 2 or 3, said protective member being surroundingly shielded by a covering member, the covering member being arranged surrounding the protective member, an inner diameter of the covering member being essentially equal to an outer diameter of said protective member.

* * * * *